(12) United States Patent
Zalawadiya et al.

(10) Patent No.: US 12,461,166 B2
(45) Date of Patent: Nov. 4, 2025

(54) ON-DIE POWER SUPPLY MONITOR DESIGN

(71) Applicant: Advanced Micro Devices, Inc., Santa Clara, CA (US)

(72) Inventors: Ankit Kamleshbhai Zalawadiya, Ahmedabad (IN); Krishnan-Talkad Sukumar, Bangalore (IN); Ravinder Reddy Rachala, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 522 days.

(21) Appl. No.: 17/507,597

(22) Filed: Oct. 21, 2021

(65) Prior Publication Data
US 2023/0129642 A1    Apr. 27, 2023

(51) Int. Cl.
*G01R 31/40* (2020.01)
*G01R 19/00* (2006.01)
*G06F 1/04* (2006.01)
*G06F 1/28* (2006.01)
(Continued)

(52) U.S. Cl.
CPC ......... *G01R 31/40* (2013.01); *G01R 19/0084* (2013.01); *G06F 1/04* (2013.01); *G06F 1/28* (2013.01); *H03K 3/0315* (2013.01); *H03K 3/037* (2013.01)

(58) Field of Classification Search
CPC .............. G01R 31/40; G01R 19/0084; G01R 19/16552; G06F 1/04; G06F 1/28; G06F 1/26; H03K 3/0315; H03K 3/037
See application file for complete search history.

(56) References Cited

U.S. PATENT DOCUMENTS 5,491,439 A * 2/1996 Kelkar ............... H03L 7/095
                                                      331/25
6,157,247 A   12/2000 Abdesselem et al.
8,723,571 B2   5/2014 Felix
(Continued)

OTHER PUBLICATIONS

J. Cortadella, M. Lupon, A. Moreno, A. Roca and S. S. Sapatnekar, "Ring Oscillator Clocks and Margins," 2016 22nd IEEE International Symposium on Asynchronous Circuits and Systems (ASYNC), Porto Alegre, Brazil, 2016, pp. 19-26, doi: 10.1109/ASYNC.2016.14. (Year: 2016).*

(Continued)

*Primary Examiner* — Son T Le
(74) *Attorney, Agent, or Firm* — Kowert, Hood, Munyon, Rankin & Goetzel, P.C.; Rory D. Rankin

(57) ABSTRACT

A system and method for efficiently measuring on-die power supply voltage are described. In various implementations, an integrated circuit includes power supply monitors across a die of the integrated circuit. A power supply monitor receives a power supply voltage and generates a code indicating a value of the power supply voltage. A first ring oscillator receives the power supply voltage and a pulse used as an enable signal. A pulse generator of the power supply monitor takes into account the process, voltage and temperature (PVT) characteristics of the integrated circuit by including at least a second ring oscillator and a modulus counter that receives an output of the second ring oscillator. Therefore, the pulse generated by the pulse generator is PVT dependent and increases gain of the power supply monitor.

20 Claims, 8 Drawing Sheets

(51) Int. Cl.
   *H03K 3/03*       (2006.01)
   *H03K 3/037*      (2006.01)

(56) References Cited

U.S. PATENT DOCUMENTS

| | | |
|---|---|---|
| 9,075,608 B2 | 7/2015 | Finch et al. |
| 10,382,014 B2 | 8/2019 | Wong et al. |
| 10,425,089 B2 | 9/2019 | Kosonocky et al. |
| 2003/0112038 A1 | 6/2003 | Naffziger |
| 2008/0298455 A1* | 12/2008 | Greenblat ............ H03K 3/0315 375/238 |
| 2012/0126847 A1* | 5/2012 | Kosonocky ............ G01R 31/40 324/764.01 |
| 2015/0026531 A1* | 1/2015 | Kosonocky .... G01R 31/318575 714/726 |
| 2015/0106642 A1 | 4/2015 | Naffziger et al. |
| 2016/0283279 A1 | 9/2016 | Schillings |
| 2017/0012584 A1 | 1/2017 | Lee et al. |
| 2018/0039317 A1 | 2/2018 | Riguer |
| 2019/0199363 A1 | 6/2019 | Kosonocky et al. |
| 2019/0317547 A1* | 10/2019 | Savoj ........................ G01K 7/01 |
| 2019/0319609 A1 | 10/2019 | Wong et al. |

OTHER PUBLICATIONS

Alberto Vega, "Synthesis of variability-tolerant circuits with adaptive clocking", Universitat Politécnica de Catalunya • Barcelona Tech—UPC, Jan. 2019 (Year: 2019).*

Sherif M. Sharroush, "A voltage-controlled ring oscillator based on an FGMOS transistor", Microelectronics Journal 66 (2017) 167-186 (Year: 2017).*

Abdul et al., "Cascaded Counters", Electronics III, 1-4 (Year: 2018).*

Office Action in U.S. Appl. No. 18/146,776, dated Nov. 21, 2024, 5 pgs.

* cited by examiner

ON-DIE POWER SUPPLY MONITOR DESIGN

BACKGROUND

Description of the Relevant Art

Both power consumption and voltage droop of modern integrated circuits has become an increasing design issue with each generation of semiconductor chips. Power dissipation and voltage droop constraints are not only an issue for portable computers and mobile communication devices, but also for high-performance superscalar microprocessors, which may include multiple processor cores, or cores, and multiple pipelines within a core. The geometric dimensions of devices and metal routes on each generation of cores are decreasing. Superscalar designs increase the density of integrated circuits on a die with multiple pipelines, larger caches, and more complex logic. Therefore, the number of nodes and buses that may switch per clock cycle significantly increases.

Cross-capacitance effects grow with decreasing geometric dimensions. Cross-capacitance increases the power consumption and noise effects on the chip. The higher operational frequencies increase both power consumption and parasitic inductance effects that also result from decreasing geometric dimensions. Some origins of parasitic inductance include bond wires, IC package leads, external supply lines, and wide buses. The parasitic inductance increases transmission line effects on a chip such as ringing and reduced propagation delays. Also, a simultaneous switching of a wide bus can cause a significant voltage drop if a supply pin served all of the line buffers on the bus.

On-die sensors attempt to measure the power supply voltage, which is input to control sub-systems such as a power controller selecting a power-performance state and a power supply generator. However, on-die sensors are environment dependent. Variations in fabrication processes, ambient temperature, an amount of voltage droop occurring during operation, and the quality of the heat removal solution alter the measurements of on-die sensors.

In view of the above, methods and systems for efficiently measuring on-die power supply voltage are desired.

Figure 1:
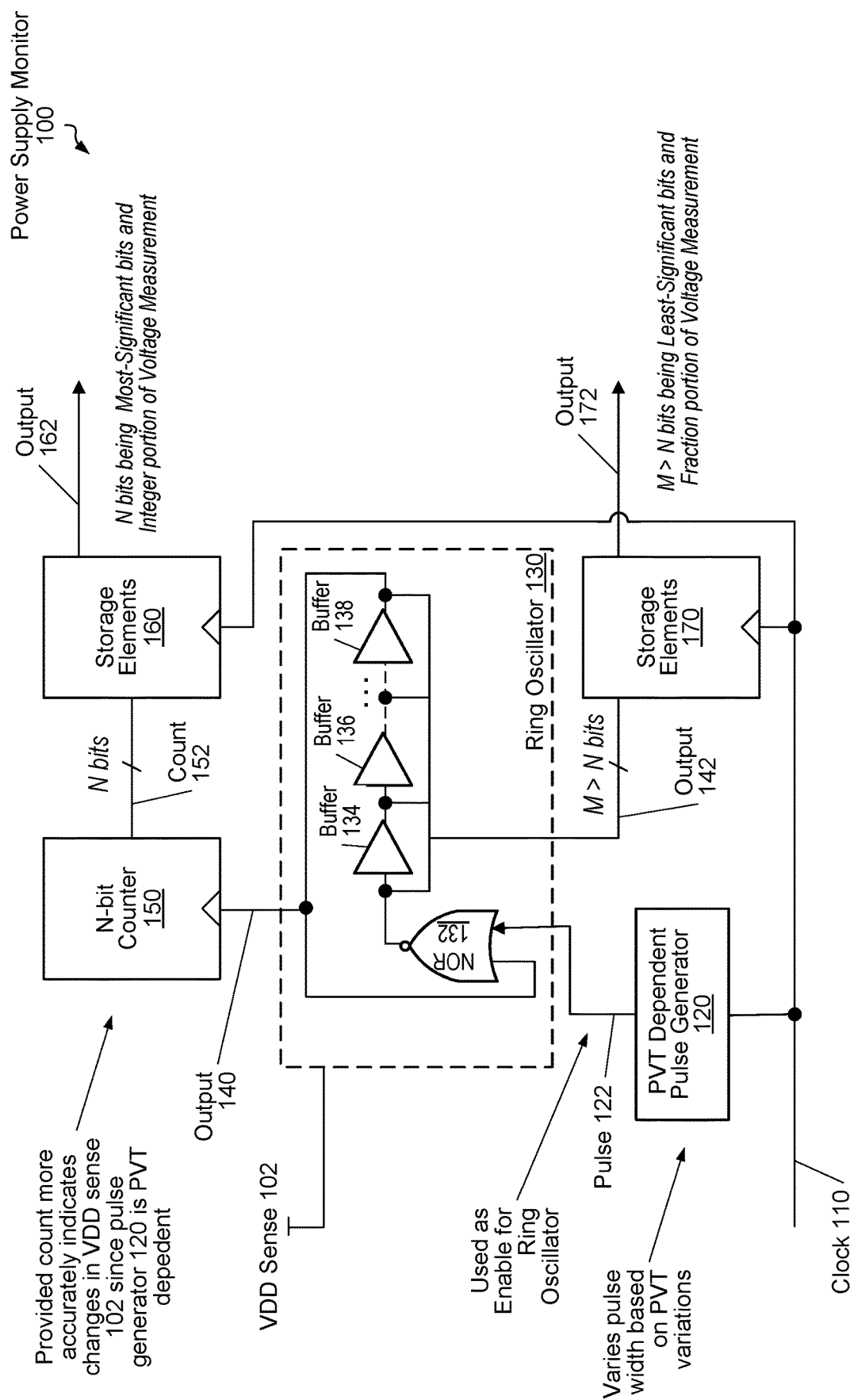
FIG. 1 is a generalized diagram of a power supply monitor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently measuring on-die power supply voltage are contemplated. In various implementations, an integrated circuit includes one or more power supply monitors across a die of the integrated circuit. One or more of the power supply monitors include a ring oscillator that when enabled, generates an output with multiple toggling cycles. The power supply monitor or external circuitry includes conversion circuitry that converts the output of the ring oscillator into a count indicating a power supply voltage value. To enable the ring oscillator, the one or more power supply monitors include a pulse generator that generates an enable signal as a pulse based on a sampling clock signal. This pulse generator uses an additional ring oscillator.

The pulse generator takes into account the process, voltage and temperature (PVT) characteristics of the integrated circuit. For example, the pulse generator uses the additional ring oscillator that includes multiple stages, each stage being a Boolean inverting stage with a stack of one or more serially connected p-type devices and a stack of one or more serially connected n-type devices. A larger number of devices in a stack of serially connected devices reduces a gain of the power supply monitor circuit, increases on-die area of the power supply monitor, increases delay of the second oscillator, but also increases the process, voltage and temperature (PVT) dependency of the power supply monitor circuit. A larger fanout of the devices in the stack of serially connected devices provides similar characteristics of the power supply monitor.

In some implementations, the pulse generator includes a modulus counter that receives an output of the second ring oscillator, and the pulse generator ends the pulse when the modulus counter has reached its last state. For example, a 3-bit modulus counter has a total of eight states. Therefore, the threshold is eight. A larger size of the modulus counter increases a gain of the power supply monitor circuit. When the count has reached a threshold, the pulse generator ends the pulse used by the first ring oscillator as an enable signal. For example, the pulse generator generates a trailing edge of the pulse. In an implementation, the pulse generator generates a falling edge as the trailing edge of the pulse to indicate the end of the pulse. In such an implementation, the first ring oscillator, which receives the pulse as an enable signal, uses a Boolean NOR gate that receives the enable signal and the output of the first ring oscillator. In another implementation, the pulse generator generates a rising edge as the trailing edge of the pulse to indicate the end of the pulse. In this implementation, the first ring oscillator, which receives the pulse as an enable signal, uses a Boolean NAND gate that receives the enable signal and the output of the first ring oscillator. Therefore, the power supply monitor is capable of using either of two polarities for the pulse. The end of this pulse indicates that the power supply monitor should end a reset phase of the first ring oscillator and begin a counting phase. During the counting phase, the power supply monitor counts the cycles on the output of the first oscillator before the end of the period of the sampling clock signal.

Turning now to FIG. 1, a generalized block diagram of a power supply monitor 100 is shown. As used herein, a "power supply monitor" is also referred to as a "voltage sensor." The power supply monitor 100 uses a ring oscillator 130 that is connected to the power supply voltage VDD Sense 102 to be measured. The ring oscillator 130 receives an enable signal, which is the pulse signal indicated as Pulse 122. The PVT (process, voltage, temperature) dependent pulse generator 120 (or pulse generator 120) generates the signal Pulse 122. The ring oscillator 130 includes a Boolean NOR gate 132 followed by a chain of buffers 134-138. As shown, the Boolean NOR gate 132 receives both the Pulse 122, which is used as an enable signal, and an output of the ring oscillator 130. In various implementations, each of the buffers 134-138 uses two inverters. The ring oscillator 130 uses an odd number of inversions between the input of the Boolean NOR gate 132 and the output of the ring oscillator 130, which is the output of the chain of buffers 134-138. The number of buffers selected for the chain is based on design requirements. The outputs 140 and 142 of the ring oscillator 130 are sent to circuitry that performs time to digital conversion (TDC), which provides a digital code that represents a measured value of the power supply voltage VDD Sense 102.

The ring oscillator 130 provides an output referred to as output 140. The output 140 of the ring oscillator 130 includes multiple toggling cycles. The low voltage level is the ground reference voltage level and the high voltage level is VDD sense 102. The Boolean NOR gate 132 receives the output of the chain of buffers 134-138. The series combination of the Boolean NOR gate 132 and the chain of buffers 134-138 has an odd number of inversions. The output 140 transitions from a first value to a second value that is an inverse of the first value after a latency of the series combination of the Boolean NOR gate 132 and the chain of buffers 134-138. Therefore, the output 140 of the ring oscillator 130 oscillates between the low voltage level and the high voltage level. The rate of oscillation of the output 140 is used to determine a measured value of VDD sense 102. The output 140 is also sent to a counter such as the N-bit counter 150. The storage elements 160 receive the count 152 from the N-bit counter 150. The differential data input signals on output 152 use VDD sense 102 as a power supply voltage, whereas, the circuitry of sequential elements 160 use another power supply voltage. In such implementations, the sequential elements 160 operate as level shifting sequential elements. The ring oscillator 130 also provides each intermediate node in a grouped output 142, which is sent to storage elements 170.

Each of the pulse generator 120 and the storage elements 160-170 receive the clock signal 110. The clock signal 110 is also referred to as the sampling clock signal 110. In some implementations, the pulse generator 120 also receives a separate enable signal in addition to the clock signal 110. In the illustrated implementation, the clock signal 110 alone is used as an enable signal by the pulse generator 120. In some implementations, the clock signal 110 is generated by external circuitry (not shown) that uses a power supply voltage different than VDD sense 102. In some implementations, the sequential elements 160 and 170 are flip-flop circuits. In other implementations, the sequential elements 160 and 170 are sense amplifier storage elements that receive differential data inputs. The differential data input signals on output 142 of the ring oscillator 130 use VDD sense 102, whereas, the circuitry of sequential elements 170 use another power supply voltage. In such implementations, the sequential elements 170 operate as level shifting sequential elements.

As shown, the sequential elements 160 receive N bits from the N-bit counter 150, whereas, the sequential elements 170 receive M bits from the ring oscillator 130. Here, each of N and M are non-zero, positive integers, and M is greater than N. In one example, N is 8 and M is 32. In such an example, the N-bit counter 150 is able to count 256 toggles of output 140 of the ring oscillator 130 during a voltage measurement. However, other values for N and M are possible and contemplated. Using the N-bit counter 150, the sequential elements 160, and possibly external conversion circuitry, the output 140 is used to provide an indication of the most significant bits of a measurement of VDD sense 102. This measurement based on the output 140 also provides an indication of the integer portion of the voltage measurement. Using the sequential elements 170 and possibly external conversion circuitry, the output 142 is used to provide an indication of the least significant bits of a measurement of VDD sense 102. This measurement based on output 142 also provides an indication of the fraction portion of the voltage measurement. In some implementations, conversion circuitry is within the power supply monitor 100, whereas, in other implementations, this conversion circuitry is located externally from the power supply monitor 100.

The pulse generator 120 adjusts the pulse width of the signal Pulse 122 based on variations in fabrication process, supply voltage and operating temperature of the die. The process, voltage and temperature (PVT) characteristics of a silicon device has significant impact on its performance and behavior. Taking measurements, such as a power supply voltage measurement, without considering PVT variations leads to erroneous results, which are used by other components. Examples of these other components are a power manager and a power supply voltage generator. By adjusting the pulse width of Pulse 122, the pulse generator 120 adjusts an amount of time to use for counting toggles on output 140 when measuring VDD sense 102. Performing this adjustment based on PVT dependency further increases the accuracy of the voltage measurement. For example, the ratio of a change in the measured power supply voltage, VDD sense 102, to a change in the measured count, which is provided by the output 162 and the output 172, should be as small as possible and uniform across process, voltage and temperature (PVT) variations. The gain of the power supply monitor 100 is the inverse of this ratio. When the gain of the power supply monitor 100 is high, the power supply monitor 100 can sense small changes in the measured power supply voltage VDD sense 102 through large changes in the values of output 162 and output 172.

Figure 2:
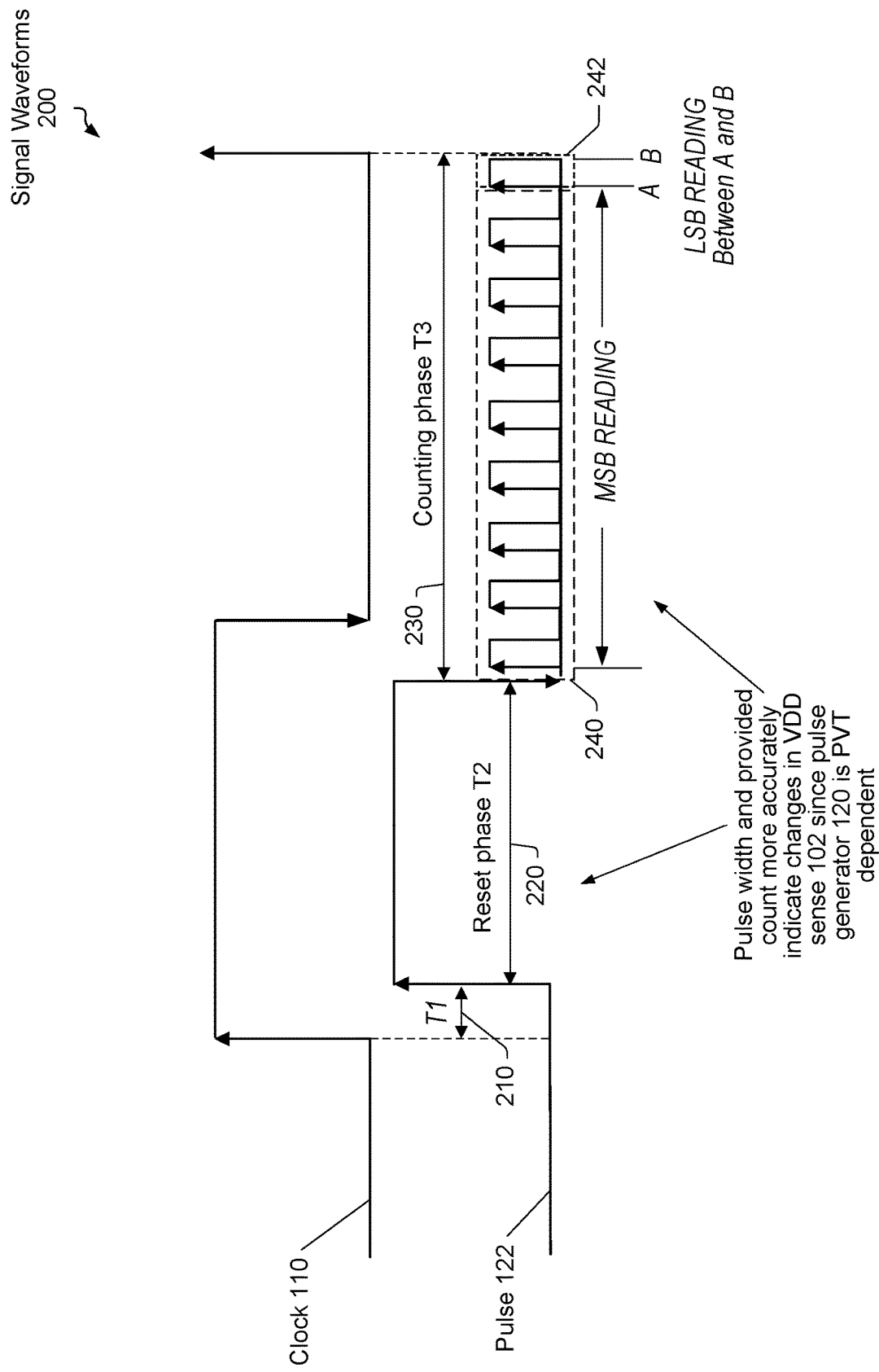
FIG. 2 is a generalized diagram of signal waveforms used to measure a power supply voltage.

Turning now to FIG. 2, a generalized block diagram of signal waveforms 200 is shown. Signals described earlier are numbered identically. The circuitry of the pulse generator 120 uses the clock signal 110 to generate the pulse signal 122, which is used as an enable signal by the ring oscillator 130 (of FIG. 1). The pulse 122 includes the duration 210, the duration 220, and the duration 230. The ring oscillator 130 provides a toggling signal to a counter during the duration 230 referred to as the counting phase T3. The counting phase T3 (duration 230) includes both a duration 240 and a duration 242. During the duration 240, an integer number of cycles generated by the ring oscillator 130 are counted. This integer number provides an indication of the most significant bits of a voltage measurement of the power supply voltage VDD sense 102. The most significant bits of this voltage measurement are provided by time to digital conversion (TDC) circuitry that generates a digital code.

During the duration 242, a fraction of a cycle generated by the ring oscillator 130 is measured. This fraction provides an indication of the least significant bits of a voltage measurement of the power supply voltage VDD sense 102. The least significant bits of this voltage measurement are provided by time to digital conversion (TDC) circuitry that generates a digital code. The counting phase T3 (duration 230) begins at the falling edge of the pulse 122, which occurs a particular pulse width 220 after the rising edge of the pulse 122. This pulse width 220 is indicated as the reset phase T2. In an implementation, the counting phase T3 (duration 230) ends at the start of a next period of the clock signal 110 such as at the next rising edge of the clock signal 110.

In some implementations, the rising edge of the pulse 122 is generated from the clock signal 110 being combined with one or more control signals by one or more of Boolean logic gates and multiplexers. The circuitry of this combinatorial logic is placed inside the pulse generator 120 (of FIG. 1). The latency to generate this output is shown as the duration 210, which is also indicated as the delay T1. The pulse width 220 is a PVT (process, voltage, temperature) dependent duration. The PVT dependent frequency variations in a second multi-stage inverter-based ring oscillator, which is included in the pulse generator 120, determines the pulse width 220.

By making the duration 220 (reset phase T2) a PVT dependent duration and having a fixed period for the clock signal 110, the duration 230 (counting phase T3) also becomes a PVT dependent duration. The duration 210 (T1) is a relatively constant duration. By making each of the durations 220 and 230 a PVT dependent duration, the change in values provided by output 162 and output 172 (of FIG. 1) do not saturate, and these values, which are indicative of the number of cycles generated by the ring oscillator 130, are PVT dependent values related to voltage changes of VDD sense 102. Therefore, the gain of the voltage sensor 100 increases.

Figure 3:
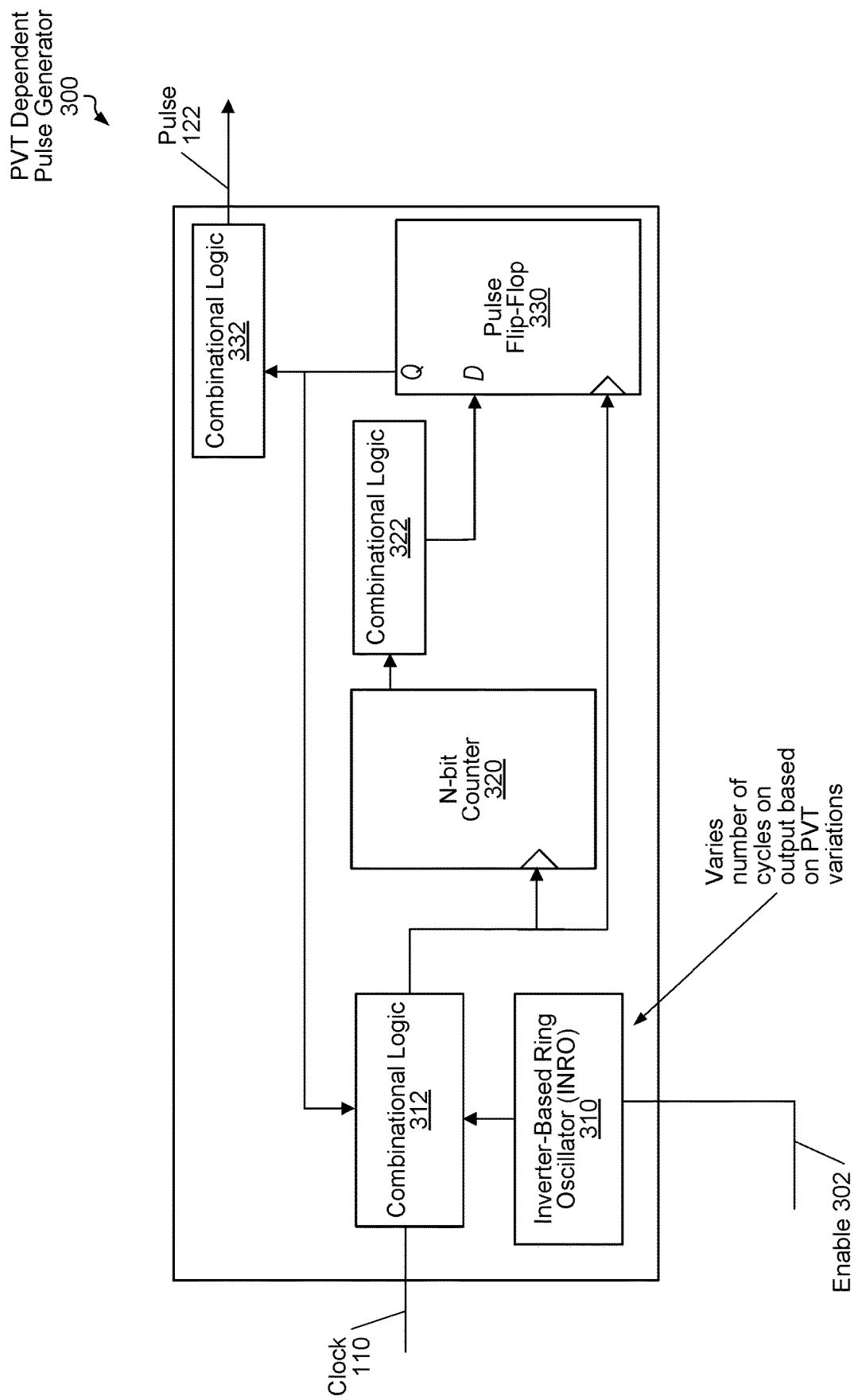
FIG. 3 is a generalized diagram of a pulse generator.

Turning now to FIG. 3, a generalized block diagram of one implementation of a PVT dependent pulse generator 300 is shown. Signals described earlier are numbered identically. In various implementations, the pulse generator 120 (of FIG. 1) utilizes the circuitry of the PVT dependent pulse generator 300. The PVT (process, voltage, temperature) dependent pulse generator 300 (or pulse generator 300) generates the signal Pulse 122. In the implementation shown, the pulse generator 300 includes an inverter-based ring oscillator (INRO) 310, an N-bit counter 320 and a Pulse Flip-flop 330. Additionally, the pulse generator 300 includes combinational logic 312, 322 and 332. The circuitry of the INRO 310 receives an enable signal 302, and the circuitry of the combinational logic 312 receives the sampling clock signal 110. The enable signal 302 is generated by external circuitry, which is not shown. In some implementations, the enable signal 302 remains asserted as long as the power supply monitor is in operation. In an implementation, when the sampling clock signal 110 has transitioned to an asserted value, the pulse generator 300 generates the pulse 122, and sends the pulse 122 to an external ring oscillator as an enable signal. In an implementation, the external ring oscillator is the ring oscillator 130 (of FIG. 1). The combinational logic 312 determines when to reset the N-bit counter 320 and when to initiate operation of the N-bit counter 320. Other control signals both received and generated by the combinational logic 312 and 322 are not shown for ease of illustration.

As used herein, a Boolean logic high level is also referred to as a logic high level. Similarly, a Boolean logic low level is also referred to as a logic low level. In various implementations, the logic high level is equal to a power supply reference voltage level and the logic low level is equal to a ground reference voltage level. As used herein, a circuit node or line is "asserted" when the node or line stores a voltage level that enables a transistor that receives the voltage level, or the voltage level indicates an operation is enabled. For example, an n-type transistor is enabled when the n-type transistor receives a positive non-zero voltage level on its gate terminal that is at least a threshold voltage above a voltage level on its source terminal.

As used herein, the circuit node or line is "negated" when the node or line stores a voltage level that disables a transistor that receives the voltage level. An n-type transistor is disabled when the n-type transistor receives a voltage level on its gate terminal that is a threshold voltage below a voltage level on its source terminal. Similarly, a p-type transistor is enabled when the p-type transistor receives a voltage level on its gate terminal that is at least a threshold voltage below a voltage level on its source terminal. The p-type transistor is negated when the p-type transistor receives a voltage level on its gate terminal that is at least a threshold voltage above a voltage level on its source terminal. Additionally, operations are enabled and disabled based on corresponding control signals being asserted or negated.

Based on the enable signal 302, the INRO 310 generates a toggling signal that includes multiple cycles on its output. The INRO 310 sends its output to the combinational logic 312. The INRO 310 uses a ring oscillator separate from the ring oscillator 130 (of FIG. 1) described earlier. In an implementation, INRO 310 uses the ring oscillator 400, which is further described in the upcoming description directed toward FIG. 4. Circuitry of the pulse generator 300 counts cycles on the output of the INRO 310. In an implementation, the output of the INRO 310 is sent directly to the clock inputs of the N-bit counter 320 and the Pulse Flip-flop circuit 330. In other implementations, other control signals (not shown) are combined the output of the INRO 310. In an implementation, the N-bit counter 320 is a modulus counter that is updated during each cycle on the output of the INRO 310 (or the output of the combinational logic 312). Here, the positive, non-zero integer N can be different than the value N used in the power supply monitor 100. In some implementations, a threshold is set to a total number of states of the modulus counter 320. For example, a 3-bit modulus counter has a total of eight states. Therefore, the threshold is eight. Other sizes of the modulus counter are possible and contemplated. A larger size of the modulus counter increases a gain of the power supply monitor circuit that uses the pulse generator 300.

When the count value of the counter 320 has reached a threshold, the pulse flip-flop 330 ends the pulse by generating a trailing edge of the pulse 122. In an implementation, the pulse generator 300 generates the trailing edge of the pulse 122 at the end of duration 220 (reset phase T2) of the signal waveforms 200 (of FIG. 2). In other implementations, other control signals are combined with the state information from the counter 320 by the combinational logic 322 before the pulse flip-flop 330 indicates the end, such as a trailing edge, of the pulse 122. As described earlier, in some implementations, the INRO 310 uses the ring oscillator 400, which is further described in the below discussion directed toward FIG. 4.

Figure 4:
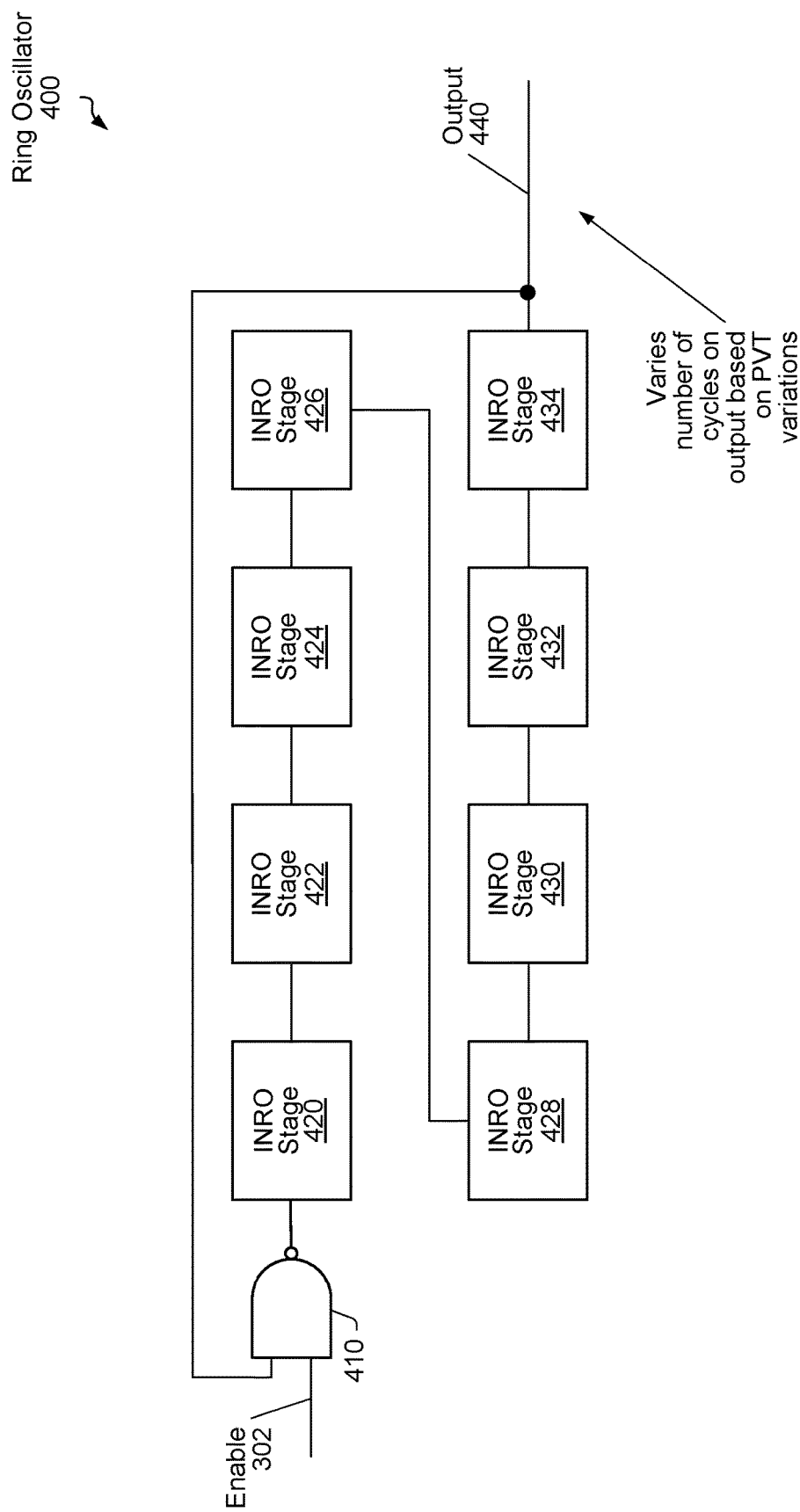
FIG. 4 is a generalized diagram of a ring oscillator.

Referring to FIG. 4, a generalized block diagram of one implementation of a ring oscillator 400 is shown. Signals described earlier are numbered identically. It is noted that in various implementations, the ring oscillator 400 is used by a pulse generator such as the pulse generator 120 (of FIG. 1) and the pulse generator 300 (of FIG. 3). In the implementation shown, the ring oscillator 400 includes a Boolean NAND gate 410 and a chain of inverter ring oscillator (INRO) stages 420-434. In an implementation, the Boolean NAND gate 410 (or gate 410) receives the enable signal 302. The gate 410 also receives the output, which is output 440, of the final stage of the INRO stages 420-434. In some implementations, the output 440 is input to one or more levels of combinatorial logic to generate another output of the ring oscillator 400. In other implementations, any other combinatorial logic is included in another functional block that receives the output 440.

Although eight INRO stages 420-434 are shown, in other implementations, the ring oscillator 400 includes another even number of INRO stages. When the enable signal 302 has a logic low level, the output 440 has a logic high level after the propagation delay of the gate 410 and the chain of INRO stages 420-434. When the enable signal 302 transitions from a logic low level to a logic high level, the output 440 has a logic low level after the propagation delay of the gate 410 and the chain of INRO stages 420-434. Afterward, while the enable signal 302 maintains a logic high level, the output 440 toggles between the logic high level and the logic low level. The latency between toggles is equal to the propagation delay of the series combination of the gate 410 and the chain of INRO stages 420-434. The toggling continues until the enable signal 302 transitions to a logic low level. It is noted that one or more of the INRO stages 420-434 use the circuitry of the ring oscillator stage 500 described further in the below discussion directed toward FIG. 5.

Figure 5:
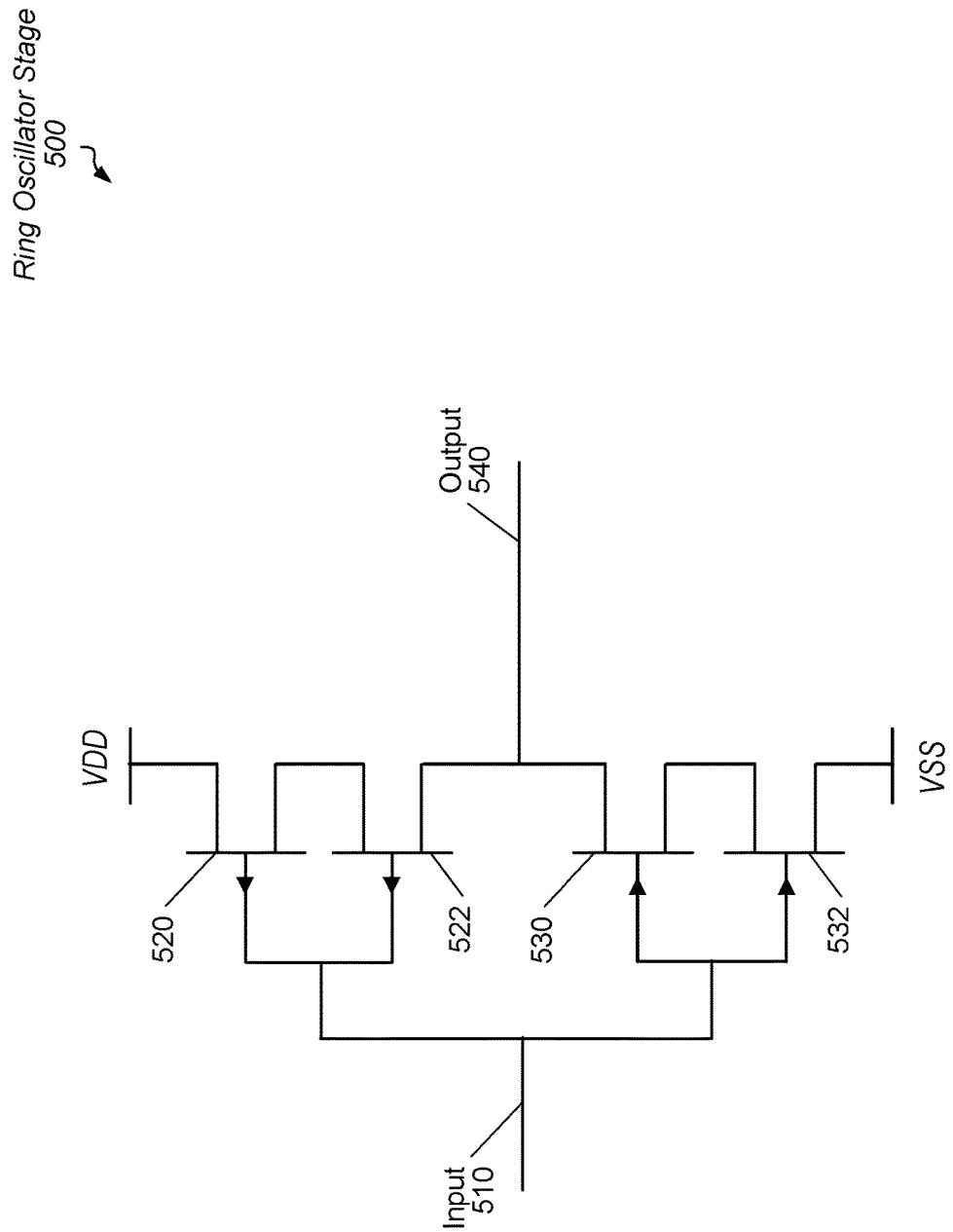
FIG. 5 is a generalized diagram of a ring oscillator stage.

Referring to FIG. 5, a generalized block diagram of one implementation of a ring oscillator stage 500 is shown. The ring oscillator stage 500 (or stage 500) includes circuitry for receiving a data input, such as Input 510, and generating an inverting value of the received data input on the output signal indicated as Output 540. In the implementation shown, the stage 500 includes a stack of two p-type devices 520 and 522 connected in a serial configuration between the power supply reference voltage level VDD and the Output 540. Additionally, the stage 500 includes a stack of two n-type devices 530 and 532 connected in a serial configuration between the Output 540 and the ground reference voltage level VSS. As used herein, a "device" also refers to a "transistor," which is also referred to as a "field effect transistor," or "FET." Although a stack of two serially-connected devices are shown being used between the Output 540 and a reference voltage level (VDD or VSS), in other implementations, another number of devices is used.

In some implementations, the devices 520-532 are long channel devices. In an implementation, the devices 520-532 are also low threshold devices. As used herein, a "long channel device" refers to a device with a channel length significantly longer than a channel length of another device used in the integrated circuit. Additionally, as used herein, a "low threshold device" refers to a device that has a turn-on threshold voltage significantly lower than a threshold voltage of another device used in the integrated circuit. In other implementations, the devices 520-532 have a channel length and a threshold voltage similar to other devices used by the integrated circuit.

The devices 520-532 track process, voltage and temperature (PVT) variations of a particular region of a semiconductor die. As the number of devices in a stack of serially-connected devices increase between the Output 540 and a reference voltage level, the delay of the stage 500 also increases. For example, if three p-type devices are placed between the reference voltage level VDD and the Output 540 instead of two p-type devices, the delay of stage 500 increases. Additionally, the on-die area of the stage 500 increases and the gain of the resulting power supply monitor decreases. However, the on-die process, voltage and temperature (PVT) dependency of the stage 500 increases despite the increased on-die area penalty and gain reduction.

As the fanout of the stage 500 increases, the delay of the stage 500 also increases and the gain of the resulting power supply monitor decreases. For example, if the fanout of the stage 500 increases from 8 to 16, the delay of the stage 500 increases and the gain of the resulting power supply monitor decreases. Additionally, the on-die area of the stage 500 increases. However, the PVT dependency of the stage 500 increases as the fanout increases. Therefore, selection of the number of serially connected devices in the stage 500 and selection of the fanout of the stage 500 affects multiple properties of the stage 500. These properties can include the PVT dependency, the delay, the on-die area, the linearity of pulse counts versus voltage, and the gain of the power supply monitor (e.g., power supply monitor 100 of FIG. 1). It is also noted when using the stage 500, it is possible to obtain increased gain and acceptable, or improved, linearity across a relatively wide range of operational frequencies. These properties of the stage 500 also affect the properties of the ring oscillator 400 (of FIG. 4), the INRO 310 (of FIG. 3), and the pulse generator 120 (of FIG. 1) in a similar manner.

Figure 6:
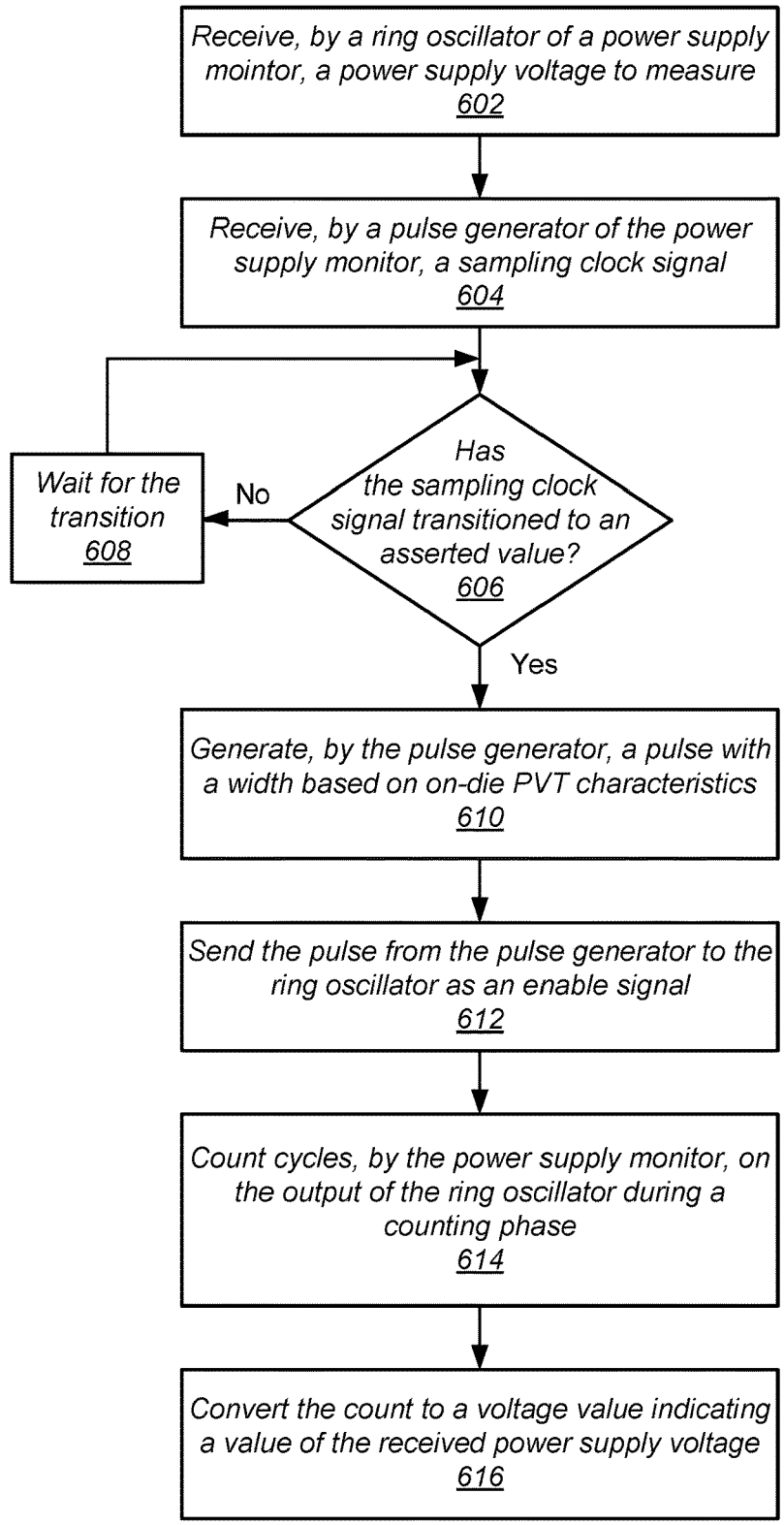
FIG. 6 is a generalized diagram of one embodiment of a method for efficiently measuring on-die power supply voltage.

Referring now to FIG. 6, one embodiment of a method 600 for efficiently measuring on-die power supply voltage is shown. For purposes of discussion, the steps in this embodiment are shown in sequential order. However, in other embodiments some steps occur in a different order than shown, some steps are performed concurrently, some steps are combined with other steps, and some steps are absent.

A ring oscillator of a power supply monitor receives a power supply voltage to measure (block 602). A pulse generator of the power supply monitor receives a sampling clock signal (block 604). If the sampling clock signal has not transitioned to an asserted value ("no" branch of the conditional block 606), then the pulse generator waits for the transition (block 608), and control flow of method 600 returns to the conditional block 606. If the sampling clock signal has transitioned to an asserted value ("yes" branch of the conditional block 606), then the pulse generator generates a pulse with a width based on on-die process, voltage and temperature (PVT) characteristics of the integrated circuit (block 610). For example, the power supply monitor 100 (of FIG. 1) uses the circuitry of the pulse generator 300 (of FIG. 3), the ring oscillator 400 (of FIG. 4), and the ring oscillator stage 500 (of FIG. 5).

The pulse generator sends the pulse from the pulse generator to the ring oscillator as an enable signal (block 612). The power supply monitor counts cycles on the output of the ring oscillator during a counting phase (block 614). In various implementations, the counting phase occurs between the end of the received pulse and the end of a period of the sampling clock signal. In one example, the power supply monitor counts cycles on the output of the ring oscillator during the duration 230 (counting phase T3) of the signal waveforms 200 (of FIG. 2). In one implementation, the end of the received pulse, which is used as an enable signal for the ring oscillator, occurs on a falling edge of the pulse. The falling edge is used as the trailing edge of the pulse. In such an implementation, the ring oscillator uses a Boolean NOR gate that receives the enable signal and the output of the ring oscillator as shown for the ring oscillator 130 (of FIG. 1).

In another implementation, the end of the received pulse, which is used as the enable signal for the ring oscillator, occurs on a rising edge of the pulse. The rising edge is used as the trailing edge of the pulse. In this implementation, the ring oscillator uses a Boolean NAND gate that receives the enable signal and the output of the ring oscillator. Therefore, the power supply monitor is capable of using either of two polarities for the pulse. Conversion circuitry converts the count to a voltage value indicating a value of the received power supply voltage (block 616). In some implementations, the power supply monitor includes this conversion circuitry, whereas, in other implementations, external circuitry located outside the power supply monitor includes this conversion circuitry.

Figure 7:
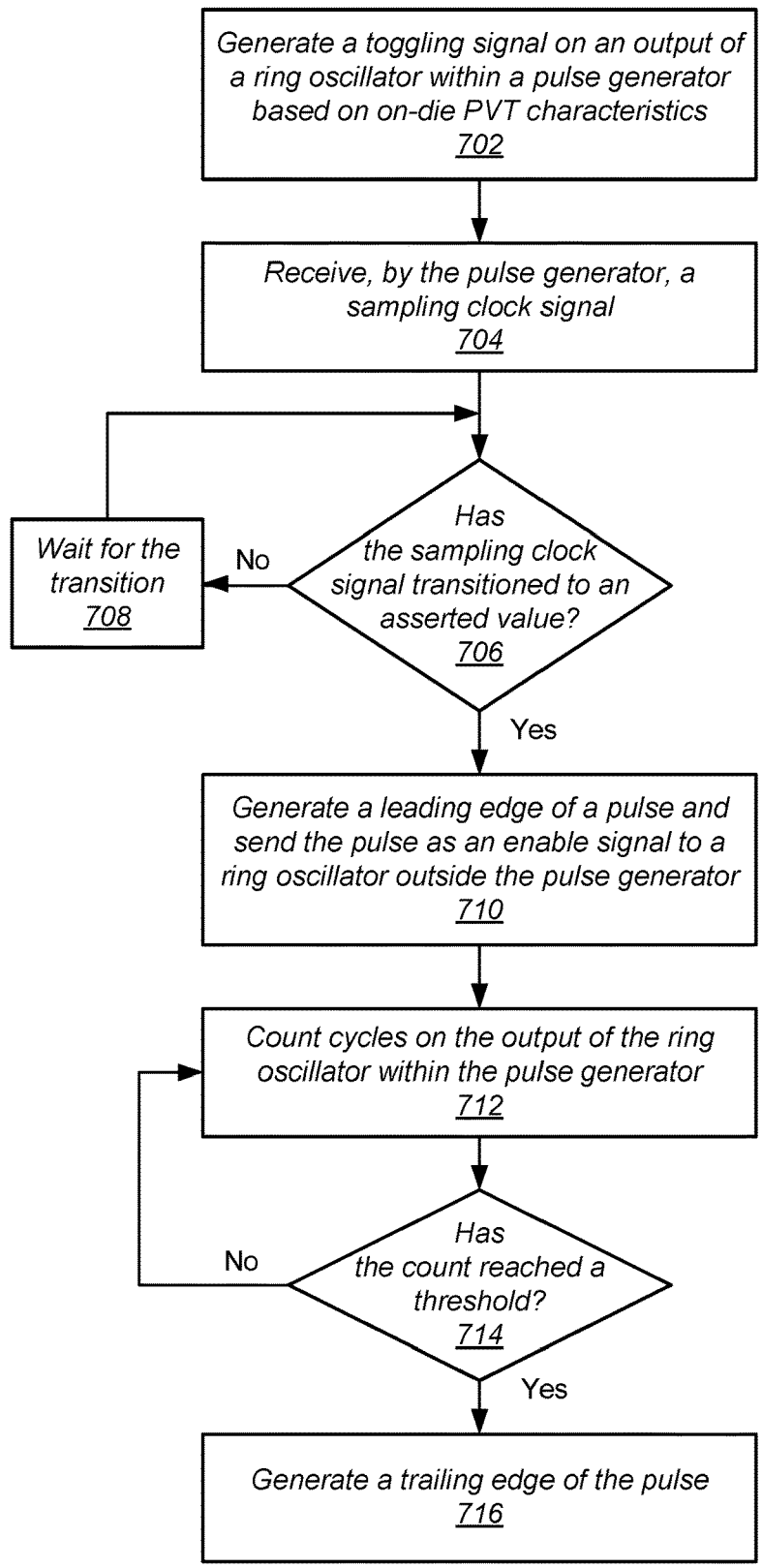
FIG. 7 is a generalized diagram of one embodiment of a method for efficiently measuring on-die power supply voltage.

Turning to FIG. 7, one embodiment of a method 700 for efficiently measuring on-die power supply voltage is shown. When enabled, circuitry of a pulse generator of a power supply monitor generates a toggling signal on an output of an internal ring oscillator based on process, voltage and temperature (PVT) characteristics of the integrated circuit (block 702). The internal ring oscillator is located within the pulse generator. For example, in some implementations, the pulse generator uses the INRO 310 (of FIG. 3). As described earlier, in an implementation, the INRO 310 includes the circuitry of the ring oscillator 400 (of FIG. 4) and the ring oscillator stage 500. Circuitry of the pulse generator of the power supply monitor receives a sampling clock signal (block 704). If the sampling clock signal has not transitioned to an asserted value ("no" branch of the conditional block 706), then the pulse generator waits for the transition (block 708), and control flow of method 700 returns to the conditional block 706. In addition, in some implementations, the pulse generator resets a modulus counter used later to count toggling cycles on an output of the ring oscillator present in the pulse generator.

If the sampling clock signal has transitioned to an asserted value ("yes" branch of the conditional block 706), then the pulse generator generates a leading edge of a pulse and sends the pulse to a separate, external ring oscillator of the power supply monitor as an enable signal (block 710). The external ring oscillator is located externally from the pulse generator. For example, in some implementations, the power supply monitor uses the ring oscillator 130 (of FIG. 1), which is located externally from the pulse generator 120. Circuitry of the pulse generator counts toggling cycles on the output of the internal ring oscillator (block 712), which is located within the pulse generator. In an implementation, the pulse generator includes a modulus counter that is updated during each toggling cycle on the output of the internal ring oscillator. In some implementations, a threshold is set to a total number of states of the modulus counter. For example, a 3-bit modulus counter has a total of eight states. Therefore, the threshold is eight. Other sizes of the modulus counter are possible and contemplated.

If the count has not reached a threshold ("no" branch of the conditional block 714), then control flow of method 700 returns to block 712 where the modulus counter of the pulse generator is updated for each toggling cycle on the output of the internal ring oscillator. If the count has reached a threshold ("yes" branch of the conditional block 714), then the pulse generator generates a trailing edge of the pulse (block 716). In an implementation, the pulse generator generates the trailing edge at the end of duration 220 (reset phase T2) of the signal waveforms 200 (of FIG. 2). In various implementations, the pulse generator uses the components of the pulse generator 300 (of FIG. 3), the ring oscillator 400 (of FIG. 4), and the ring oscillator stage 500 (of FIG. 5).

Figure 8:
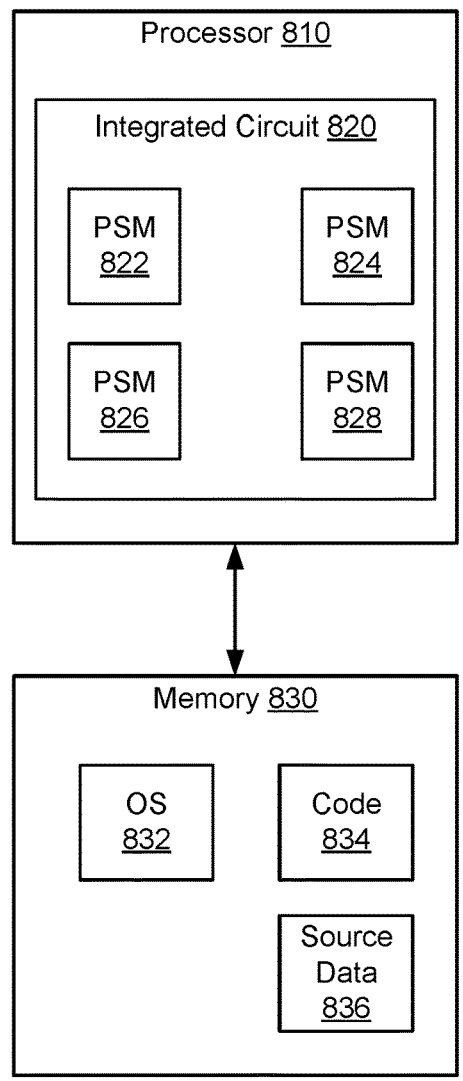
FIG. 8 is a generalized diagram of computing system with power supply monitors.

Referring to FIG. 8, one embodiment of a computing system 800 is shown. The computing system 800 includes the processor 810 and the memory 830. Interfaces, such as a memory controller, a bus or a communication fabric, one or more phased locked loops (PLLs) and other clock generation circuitry, a power management unit, and so forth, are not shown for ease of illustration. It is understood that in other implementations, the computing system 800 includes one or more of other processors of a same type or a different type than processor 810, one or more peripheral devices, a network interface, one or more other memory devices, and so forth. In some implementations, the functionality of the computing system 800 is incorporated on a system on chip (SoC). In other implementations, the functionality of the computing system 800 is incorporated on a peripheral card inserted in a motherboard. The computing system 800 is used in any of a variety of computing devices such as a desktop computer, a tablet computer, a laptop, a smartphone, a smartwatch, a gaming console, a personal assistant device, and so forth.

The processor 810 includes hardware such as circuitry. For example, the processor 810 includes at least one integrated circuit 820, which utilizes PVT dependent power supply monitors (PSMs) 822-828. For example, one or more of the PSMs 822-828 use the circuitry of the power supply monitor 100 (of FIG. 1), the pulse generator 300 (of FIG. 3), the ring oscillator 400 (of FIG. 4), and the ring oscillator stage 500 (of FIG. 5). Although four PSMs 822-828 are shown, it is contemplated that the integrated circuit 820 includes any number of power supply monitors. In various implementations, the processor 810 includes one or more processing units. In some implementations, each of the processing units includes one or more processor cores capable of general-purpose data processing, and an associated cache memory subsystem. In such an implementation, the processor 810 is a central processing unit (CPU). In another implementation, the processing cores are compute units, each with a highly parallel data microarchitecture with multiple parallel execution lanes and an associated data storage buffer. In such an implementation, the processor 810 is a graphics processing unit (GPU), a digital signal processor (DSP), or other.

In some implementations, the memory 830 includes one or more of a hard disk drive, a solid-state disk, other types of flash memory, a portable solid-state drive, a tape drive and so on. The memory 830 stores an operating system (OS) 832, one or more applications represented by code 834, and source data 836. Memory 830 is also capable of storing intermediate result data and final result data generated by the processor 810 when executing a particular application of code 834. Although a single operating system 832 and a single instance of code 834 and source data 836 are shown, in other implementations, another number of these software components are stored in memory 830. The operating system 832 includes instructions for initiating the boot up of the processor 810, assigning tasks to hardware circuitry, managing resources of the computing system 800 and hosting one or more virtual environments.

Each of the processor 810 and the memory 830 includes an interface unit for communicating with one another as well as any other hardware components included in the computing system 800. The interface units include queues for servicing memory requests and memory responses, and control circuitry for communicating with one another based on particular communication protocols. The communication protocols determine a variety of parameters such as supply voltage levels, power-performance states that determine an operating supply voltage and an operating clock frequency, a data rate, one or more burst modes, and so on.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power supply monitor circuit comprising:
a first ring oscillator configured to:
receive a pulse and a power supply voltage; and
generate, based on the power supply voltage, an output comprising a plurality of cycles responsive to determining the pulse has ended;
conversion circuitry configured to convert the output comprising the plurality of cycles to a value indicating a measure of the power supply voltage; and
a pulse generator comprising a second ring oscillator, wherein the second ring oscillator is configured to generate the pulse with a pulse width duration that is dependent on one or more of process, voltage, or temperature.

2. The power supply monitor circuit as recited in claim 1, wherein one or more stages of a plurality of stages of the second ring oscillator comprise a stack of serially connected p-type devices and a stack of serially connected n-type devices.

3. The power supply monitor circuit as recited in claim 1, wherein each of the pulse generator, and a plurality of storage elements that store the value, receive a clock signal with a fixed period causing a duration of the output of the first ring oscillator to be generated during a period of time that is dependent on one or more of process, voltage, or temperature.

4. The power supply monitor circuit as recited in claim 2, wherein a larger fanout of devices in the stack of serially connected devices reduces a gain of the power supply monitor circuit.

5. The power supply monitor circuit as recited in claim 1, wherein the pulse generator further comprises a modulus counter configured to receive an output of the second ring oscillator as an input clock, wherein the pulse generator is configured to end the pulse responsive to determining the modulus counter has reached its last state.

6. The power supply monitor circuit as recited in claim 5, wherein a larger size of the modulus counter increases a gain of the power supply monitor circuit.

7. The power supply monitor circuit as recited in claim 5, wherein the pulse generator further comprises a pulse flip-flop configured to:
receive the output of the second ring oscillator as an input clock; and
convey the pulse to the first ring oscillator.

8. A method comprising:
receiving, by a first ring oscillator of a power supply monitor circuit, a pulse and a power supply voltage;
generating, based on the power supply voltage by the first ring oscillator, an output comprising a plurality of cycles responsive to determining the pulse has ended;
converting, by conversion circuitry of the power supply monitor circuit, the output comprising the plurality of cycles to a value indicating a measure of the power supply voltage; and
generating the pulse by a second ring oscillator of a pulse generator of the power supply monitor circuit with a pulse width duration that is dependent on one or more of process, voltage, or temperature.

9. The method as recited in claim 8, wherein one or more stages of a plurality of stages of the second ring oscillator comprise a stack of serially connected p-type devices and a stack of serially connected n-type devices.

10. The method as recited in claim 8, wherein each of the pulse generator, and a plurality of storage elements that store the value, receive a clock signal with a fixed period causing a duration of the output of the first ring oscillator to be generated during a period of time that is dependent on one or more of process, voltage, or temperature.

11. The method as recited in claim 9, wherein a larger fanout of devices in the stack of serially connected devices reduces a gain of the power supply monitor circuit.

12. The method as recited in claim 8, further comprising:
receiving, by a modulus counter of the pulse generator, an output of the second ring oscillator as an input clock; and
ending the pulse, by the pulse generator, responsive to determining the modulus counter has reached its last state.

13. The method as recited in claim 12, wherein a larger size of the modulus counter increases a gain of the power supply monitor circuit.

14. The method as recited in claim 12, further comprising:
receiving, by a pulse flip-flop, the output of the second ring oscillator as an input clock; and
conveying, by the pulse flip-flop, the pulse to the first ring oscillator.

15. A computing system comprising:
a memory configured to store instructions of one or more tasks and source data to be processed by the one or more tasks;
an integrated circuit configured to execute the instructions using the source data, wherein the integrated circuit comprises one or more power supply monitor circuits, each comprising:
a first ring oscillator configured to:
receive a pulse and a power supply voltage; and
generate, based on the power supply voltage, an output comprising a plurality of cycles responsive to determining the pulse has ended;
conversion circuitry configured to convert the output comprising the plurality of cycles to a value indicating a measure of the power supply voltage; and
a pulse generator comprising a second ring oscillator, wherein the second ring oscillator is configured to generate the pulse with a pulse width duration that is dependent on one or more of process, voltage, or temperature.

16. The computing system as recited in claim 15, wherein one or more stages of a plurality of stages of the second ring oscillator comprise a stack of serially connected p-type devices and a stack of serially connected n-type devices.

17. The computing system as recited in claim 16, wherein a larger number of devices in the stack of serially connected devices reduces a gain of the one or more power supply monitor circuits.

18. The computing system as recited in claim 15, wherein each of the pulse generator, and a plurality of storage elements that store the value, receive a clock signal with a fixed period causing a duration of the output of the first ring oscillator to be generated during a period of time that is dependent on one or more of process, voltage, or temperature.

19. The computing system as recited in claim 15, wherein the pulse generator further comprises a modulus counter configured to receive an output of the second ring oscillator as an input clock, wherein the pulse generator is configured to end the pulse responsive to determining the modulus counter has reached its last state.

20. The computing system as recited in claim 19, wherein a larger size of the modulus counter increases a gain of the one or more power supply monitor circuits.

* * * * *